United States Patent
Hudson, III et al.

(10) Patent No.: US 8,423,981 B2
(45) Date of Patent: Apr. 16, 2013

(54) COMPILING A GRAPHICAL PROGRAM HAVING A TEXTUAL LANGUAGE PROGRAM PORTION FOR A REAL TIME TARGET

(75) Inventors: Duncan G. Hudson, III, Austin, TX (US); Rishi H. Gosalia, Austin, TX (US)

(73) Assignee: National Instruments Corporation, Austin, TX (US)

( * ) Notice: Subject to any disclaimer, the term of this patent is extended or adjusted under 35 U.S.C. 154(b) by 972 days.

(21) Appl. No.: 12/486,976

(22) Filed: Jun. 18, 2009

(65) Prior Publication Data

US 2010/0325617 A1  Dec. 23, 2010

(51) Int. Cl.
G06F 9/45 (2006.01)

(52) U.S. Cl.
USPC ............................ 717/140; 717/114; 717/142

(58) Field of Classification Search .................. 717/109, 717/140–144, 112–115, 153–155; 715/760–763
See application file for complete search history.

(56) References Cited

U.S. PATENT DOCUMENTS

| | | | |
|---|---|---|---|
| 4,796,179 A | 1/1989 | Lehman et al. | |
| 4,831,580 A | 5/1989 | Yamada | |
| 4,901,221 A | 2/1990 | Kodosky et al. | |
| 4,914,568 A | 4/1990 | Kodosky et al. | |
| 5,089,973 A | 2/1992 | Furtek | |
| 5,119,495 A * | 6/1992 | King | 717/153 |
| 5,210,837 A | 5/1993 | Wiecek | |
| 5,237,691 A | 8/1993 | Robinson | |
| 5,481,712 A | 1/1996 | Silver et al. | |
| 5,481,741 A | 1/1996 | McKaskle et al. | |
| 5,504,901 A * | 4/1996 | Peterson | 717/144 |
| 5,576,946 A | 11/1996 | Bender et al. | |
| 5,612,866 A | 3/1997 | Savanyo et al. | |
| 5,732,277 A | 3/1998 | Kodosky et al. | |
| 5,742,504 A | 4/1998 | Meyer et al. | |
| 5,790,863 A * | 8/1998 | Simonyi | 717/113 |
| 5,848,274 A * | 12/1998 | Hamby et al. | 717/153 |
| 5,862,372 A | 1/1999 | Morris et al. | |

(Continued)

FOREIGN PATENT DOCUMENTS

EP  1077404 C1  2/2001

OTHER PUBLICATIONS

Risley et al, "Visulization of compile time errors in Java compatible visual language" IEEE, pp. 22-29, 1998.*
Ungar et al, "Self", ACM pp. 1-50, 2007.*

(Continued)

*Primary Examiner* — Anil Khatri
(74) *Attorney, Agent, or Firm* — Meyertons Hood Kivlin Kowert & Goetzel, P.C.; Jeffrey C. Hood; Joel L. Stevens (57) ABSTRACT

Compiling a graphical program including a textual program portion for execution on a real time target. The graphical program may be created on a display or stored in a memory medium. The graphical program may include a plurality of connected nodes which visually indicate functionality of the graphical program. The graphical program may include at least one node which corresponds to a textual language program portion. The textual language program portion may be written or specified in a dynamically typed programming language. The graphical program may be compiled for deployment on the real time target. Compiling the graphical program may include compiling the plurality of connected nodes and the textual language program portion for deterministic real time execution on the real time target.

17 Claims, 7 Drawing Sheets

U.S. PATENT DOCUMENTS

| | | | |
|---|---|---|---|
| 5,911,070 A | 6/1999 | Solton et al. | |
| 5,930,507 A * | 7/1999 | Nakahira et al. | 717/160 |
| 5,940,296 A | 8/1999 | Meyer | |
| 5,956,513 A * | 9/1999 | McLain, Jr. | 717/142 |
| 5,966,532 A | 10/1999 | McDonald et al. | |
| 6,053,951 A | 4/2000 | McDonald et al. | |
| 6,064,409 A | 5/2000 | Thomsen et al. | |
| 6,173,438 B1 | 1/2001 | Kodosky et al. | |
| 6,219,628 B1 | 4/2001 | Kodosky et al. | |
| 6,366,300 B1 | 4/2002 | Ohara | |
| 6,437,805 B1 | 8/2002 | Sojoodi et al. | |
| 6,446,257 B1 * | 9/2002 | Pradhan et al. | 717/154 |
| 6,453,464 B1 | 9/2002 | Sullivan et al. | |
| 6,715,139 B1 | 3/2004 | Kodosky et al. | |
| 6,865,429 B1 | 3/2005 | Schneider et al. | |
| 6,880,130 B2 | 4/2005 | Makowski et al. | |
| 6,961,868 B2 | 11/2005 | Tormasov et al. | |
| 7,000,190 B2 | 2/2006 | Kudukoli et al. | |
| 7,024,660 B2 | 4/2006 | Andrade et al. | |
| 7,043,693 B2 | 5/2006 | Wenzel et al. | |
| 7,062,718 B2 | 6/2006 | Kodosky | |
| 7,076,740 B2 | 7/2006 | Santori et al. | |
| 7,093,231 B2 * | 8/2006 | Nuss | 717/114 |
| 7,120,876 B2 | 10/2006 | Washington et al. | |
| 7,159,183 B1 | 1/2007 | Kudukoli et al. | |
| 7,200,838 B2 | 4/2007 | Kodosky et al. | |
| 7,210,117 B2 | 4/2007 | Kudukoli et al. | |
| 7,302,675 B2 | 11/2007 | Rogers et al. | |
| 7,340,684 B2 * | 3/2008 | Ramamoorthy et al. | 715/763 |
| 7,376,933 B2 * | 5/2008 | Gerken et al. | 717/106 |
| 7,404,182 B1 * | 7/2008 | Garthwaite et al. | 717/140 |
| 7,509,244 B1 | 3/2009 | Shakeri et al. | |
| 7,509,619 B1 | 3/2009 | Miller et al. | |
| 7,533,362 B1 | 5/2009 | Pritchard | |
| 7,620,943 B1 * | 11/2009 | Garthwaite | 717/140 |
| 7,627,860 B2 * | 12/2009 | Kodosky et al. | 717/141 |
| 7,689,917 B2 * | 3/2010 | Washington et al. | 715/717 |
| 7,802,229 B2 * | 9/2010 | Kornerup et al. | 717/109 |
| 7,840,904 B2 * | 11/2010 | Shah et al. | 715/763 |
| 7,861,217 B2 * | 12/2010 | Ciolfi | 717/105 |
| 7,882,444 B2 * | 2/2011 | Crain et al. | 715/760 |
| 7,945,894 B2 * | 5/2011 | Peck et al. | 717/109 |
| 7,975,233 B2 * | 7/2011 | Macklem et al. | 715/763 |
| 8,108,833 B2 * | 1/2012 | Dellas et al. | 717/109 |
| 2001/0020291 A1 | 9/2001 | Kudukoli et al. | |
| 2002/0129333 A1 | 9/2002 | Chandhoke et al. | |
| 2003/0046663 A1 | 3/2003 | Rogers et al. | |
| 2003/0071842 A1 | 4/2003 | King et al. | |
| 2003/0071845 A1 | 4/2003 | King et al. | |
| 2004/0010734 A1 | 1/2004 | Ghercioiu et al. | |
| 2004/0034696 A1 | 2/2004 | Joffrain et al. | |
| 2004/0034847 A1 | 2/2004 | Joffrain et al. | |
| 2004/0158812 A1 | 8/2004 | Dye et al. | |
| 2004/0199897 A1 | 10/2004 | Ghercioiu et al. | |
| 2004/0210592 A1 | 10/2004 | Ciolfi | |
| 2004/0230946 A1 | 11/2004 | Makowski et al. | |
| 2005/0028138 A1 | 2/2005 | Case et al. | |
| 2005/0091602 A1 | 4/2005 | Ramamoorthy et al. | |
| 2005/0177816 A1 | 8/2005 | Kudukoli et al. | |
| 2005/0235290 A1 | 10/2005 | Jefferson et al. | |
| 2005/0251789 A1 | 11/2005 | Peck et al. | |
| 2005/0257194 A1 | 11/2005 | Morrow et al. | |
| 2005/0257195 A1 | 11/2005 | Morrow et al. | |
| 2006/0225034 A1 | 10/2006 | Peck et al. | |
| 2007/0044030 A1 | 2/2007 | Hayles | |
| 2007/0044071 A1 | 2/2007 | Hayles | |
| 2008/0022259 A1 | 1/2008 | Macklem et al. | |
| 2008/0022264 A1 | 1/2008 | Macklem et al. | |
| 2009/0049424 A1 | 2/2009 | Kumar et al. | |

OTHER PUBLICATIONS

Ykhlef et al, "GQLX: A new graphical query language for XML Data", ACM iiWAS, pp. 201-208, 2009.*

Merkle, "Textual modling tools: Overview and comparision of language workbenches", ACM SPLASH, pp. 139-148, 2010.*

Edwards, "The Specification and Execution of Heterogeneous Synchronous Reactive Systems", Doctoral Dissertation, University of California, Berkeley, 1997, 170 pages.

Pino, et al., "Cosimulating Synchronous DSP Designs with Analog RF Circuits," Hewlett Packard, 1999, 15 pages.

Altium Limited, "Altium Nexar release heads 'LiveDesign-enabled' 2004 product line-up", Press Release, Feb. 17, 2004, 3 pages.

AXYS Design Automation, Inc., "Product Description for MaxCore", 2002, 2 pages.

AXYS Design Automation, Inc., "Product Description for MaxSim", 2002, 2 pages.

International search report and written opinion, application No. PCT/US2005/016630, mailed Feb. 21, 2006.

Chang, et al., "Heterogeneous Simulation—Mixing Discrete-Event Models with Dataflow", Journal of VLSI Signal Processing, The Netherlands, 1997, pp. 127-144.

Buck, et al., "Ptolemy: A Framework for Simulating and Prototyping Heterogeneous Systems", International Journal in Computer Simulation, vol. 4, No. 2, 1994, pp. 155-182.

Besnard, et al, "Design of a multi-formalism application and distribution in a data-flow context: an example", 12th International Symposium on Languages for International Programming, Athens, Greece, Jun. 1999, pp. 8-30.

Andrade, et al., "Software Synthesis from Dataflow Models for G and LabVIEW", IEEE Asilomar Conference on Signals, Systems, and Computers, Pacific Grove, California, Nov. 1998, pp. 1705-1709.

National Instruments, "The Measurement and Automation Catalog 2004", National Instruments, 2004, 3 pages.

The MathWorks, "Stateflow for State Diagram Modeling User's Guide", Version 4, 1997, 6 pages.

The MathWorks, "Simulink Model-Based and System-Based Design", Version 5, Jul. 2002, 598 pages.

Simulink, "Simulink Release Notes", Jun. 2, 2004, 78 pages.

Chandrachoodan, et al., "An Efficient Timing Model for Hardware Implementation of Multirate Dataflow Graphs", IEEE, 2001, pp. 1153-1156.

"Optilab: Image Processing and Analysis Software for the Apple Macintosh II User's Manual", GTFS Inc., 1990, 238 pages.

Rizzo, "Image Analyst and Enhance", MacUser, Jul. 1990, pp. 55-58.

Rosenthal, et al., "Integrated Approach to Machine Vision Application Development", SPIE vol. 1386, Nov. 8, 1990, pp. 158-162.

Villiger, et al., "Self-timed Ring for Globally-Asynchronous Locally-Synchronous Systems", Proceedings of the 9th International Symposium on Asynchronous Circuits and Systems, 2003, IEEE, pp. 1-10.

Automatix, "Vision for Process Feedback and Control", News Release, www.applefritter.com/macclones/automatix/newsrelease, Jul. 3, 2000, 4 pages.

"GUI Definition", www.whatis.com, http://searchvb.techtarget.com/sDefinition/0,290660,sid8_gci213989,00.html, retrieved May 14, 2007, 1 page.

Mort, et al., "Low Cost Image Analysis Workstation Which is Menu Driven and Extensible", SPIE, vol. 1232, Feb. 4, 1990, pp. 380-389.

Signal Analytics, "IPLab User's Guide", 1991, 268 pages.

Gitlow, "X-Ray Vision", MacGuide Magazine, vol. 2, Issue 4, Jun. 1989, pp. 89-94.

Ford, "Optimage Processes Scientific Images", 1994, 1 page.

Signal Analytics Corp., "Signal Analytics Brings Powerful Scientific Image Processing to the Macintosh II", News Release, Feb. 1, 1990, 2 pages.

Signal Analytics Corp., "IPLab: Serious Scientific Image Processing for the Macintosh II", 1992, 4 pages.

Signal Analytics Corp., "IPLab Gives You Unparalleled Value", 1992, 6 pages.

Signal Analytics Corp., "IPLab Brings Affordable Scientific Image Processing to the Macintosh II", estimated 1990, 2 pages.

Automatix, Inc., "A Seminar on Machine Vision & Image Analysis", 1993, 46 pages.

National Instruments, "Measurement and Automation Catalogue 1999", pp. 518-520.

"Ultimage and IPLab Spectrum", MacUser, Jul. 1991, 5 pages.

Magnusson, "State diagram generation", Term paper in the graduate course Attribute Grammars, Lund University, Spring 1999, 21 pages.

Vasilache, et al., "Translating OMT State Diagrams with Concurrency into SDL Diagrams", University of Tsukuba, Japan, Aug. 28-31, 2000, 7 pages.

"Graphical User Interface (GUI)", The Motive Web Design Glossary, www.motive.co.nz/glossary/gui.php, retrieved May 14, 2007, 2 pages.

National Instruments, "IMAQ Vision Builder Tutorial", Jan. 1999, 73 pages.

"Special Report: Imaging and the Macintosh/Robust Image Databases" Advanced Imaging, Apr. 1991, pp. 18-32.

Bhattacharyya, et al., "Synthesis of Embedded Software from Synchronous Dataflow Specifications", Journal of VLSI Signal Processing, vol. 21, 1999, pp. 151-166.

Hunt, "IDF: A graphical dataflow programming language for image processing and computer vision", IEEE, 1990, retrieved from the IEEE database Jan. 7, 2003, pp. 351-360.

Keddy, et al., "DEDIP: A User-friendly environment for digital image processing algorithm development", IEEE, 1991, retrieved from the IEEE database on Jan. 1, 2003, pp. 733-736.

Konstantinides, et al., "The Khoros Software Development Environment for Image and Signal Processing", 1992, retrieved from http://www.hpl.hp.com/techreports/92/HPL-92-96.pdf on Jan. 7, 2003, pp. 1-14.

Sim, et al., "Design and Implementation of the Visual Programming Environment for the Distributed Image Processing", IEEE, 1996, retrieved from IEEE database on Jan. 7, 2003, pp. 149-152.

"SILMA Products—Production PILOT", retrieved from Internet on May 24, 2001, www.adept.com/Silma/products/pd-productionpilot.html, 4 pages.

"RoboWorks", Newtonium, retrieved from Internet on Mar. 30, 2002, www.newtonium.com/public_html/Products/RoboWorks/RoboWorks.htm, 3 pages.

National Instruments, "The Measurement and Automation Catalog 2002", 19 pages.

Compumotor, "Motion Architect User Guide", Aug. 1994, 24 pages.

GE Fanuc, "GE Fanuc Automation—Software Solutions", 2002, 8 pages.

GE Industrial Systems, "Cimplicity Machine Edition—Motion Developer", Dec. 6, 2001, 4 pages.

GE Fanuc, "GE Fanuc Automation—Cimplicity Machine Edition", 2000, 4 pages.

"Motion Builder: Making Motion Control Programming Easy", Servo Catalogue, Parker Automation, undated, pp. 86-87.

Lee, Edward A., Stephen Neuendorffer, "Actor-Oriented Design of Embedded Hardware and Software Systems", Journal of Circuits, Systems, and Computers, vol. 12, No. 3, World Scientific Publishing Company, 2003, 30 pages.

Lee, Edward A., "Embedded Software", Advances in Computers, vol. 56, Academic Press, London, 2002, 34 pages.

Lee, Edward A. Stephen Neuendorffer, "Concurrent Models of Computation for Embedded Software", IEE Proc.-Comput. Digit. Tech., vol. 152, No. 2, Mar. 2005, 12 pages.

U.S. Appl. No. 11/759,991, titled "Diagram with Configurable Wires", filed Jun. 8, 2007, whose inventors are Jeffrey L. Kodosky, Jeffrey N. Correll, David W. Fuller III, Timothy J. Hayles, John R. Breyer, and Jacob Kornerup, 105 pages.

Lee, Edward A. et al, "Ptolemy II, Heterogeneous Concurrent Modeling and Design in Java", Jul. 29, 2004, http://ptolemy.eecs.berkeley.edu/papers/04/ptIIDesignIntro/ptIIdesign1-intro.pdf, 282 pages.

* cited by examiner

COMPILING A GRAPHICAL PROGRAM HAVING A TEXTUAL LANGUAGE PROGRAM PORTION FOR A REAL TIME TARGET

FIELD OF THE INVENTION

The present invention relates to the field of graphical programming, and more particularly to a system and method for compiling a graphical program having a textual language program portion for a real time target.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Some graphical programming environments have allowed for the incorporation of textual code in the graphical program. However, deploying such programs to targets which require execution in real time has been problematic. Correspondingly, improvements in graphical programming are desired.

SUMMARY OF THE INVENTION

Various embodiments are presented of a system and method for compiling a graphical program having a textual language program portion for a real time target.

Initially, a graphical program (e.g., a graphical data flow program) may be received or stored on a memory medium. For example, the graphical program may be created or otherwise displayed on a display. The graphical program may include a plurality of connected nodes which visually indicate functionality of the graphical program. The graphical program may include at least one node (or portion) which corresponds to a textual language program portion, which may be written in a dynamically typed programming language;

The graphical program may be compiled for deployment on a real time target. Thus, the method may compile the plurality of connected nodes and the textual language program portion for deterministic real time execution on the real time target.

For example, the method may infer strict types for the textual language program portion when compiling the graphical program. In one embodiment, generic data types may be used for variables in the textual language program, e.g., followed by type propagation to infer the strict types.

In some embodiments, the method may automatically convert the textual language program portion into a graphical program portion and compile that graphical program portion. Similar to above, the graphical program portion may similarly use generic data types followed by type propagation.

The method may further include deploying the compiled graphical program on the real time target. The real time target may comprise a processor and memory, wherein the memory stores a real time operating system executable by the processor.

In further embodiments, the real time target may include a programmable hardware element. Correspondingly, the method may include generating a hardware description file for the programmable hardware element based on at least a portion of the textual language program portion. The programmable hardware element may then be configured according to the hardware description file, e.g., to deploy the compiled graphical program.

Finally, the graphical program may be executed or operated on the real time target in a deterministic manner.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 11/539,449 titled "Automatic Conversion of Text-Based Code Having Function Overloading and Dynamic Types into a Graphical Program for Compiled Execution," filed Oct. 6, 2006.

U.S. patent application Ser. No. 11/838,387 titled "Type Generic Graphical Programming", filed on Aug. 14, 2007, US Patent Application Publication No. 20090049424.

U.S. Pat. No. 7,302,675, titled "System and Method for Analyzing a Graphical Program Using Debugging Graphical Programs", filed Apr. 10, 2002.

U.S. Pat. No. 7,024,660, titled "Debugging A Program Intended to Execute on a Reconfigurable Device Using a Test Feed-Through Configuration", filed Oct. 29, 2001.

U.S. Pat. No. 6,064,409, titled "System and Method for Providing AudioProbe and Debugging Features in a Graphical Data Flow Program", filed Feb. 14, 1997.

U.S. Pat. No. 6,715,139, titled "System and Method for Providing and Displaying Debugging Information of a Graphical Program on a First Computer During Execution of the Graphical Program on a Second Computer," filed Aug. 3, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 1A:
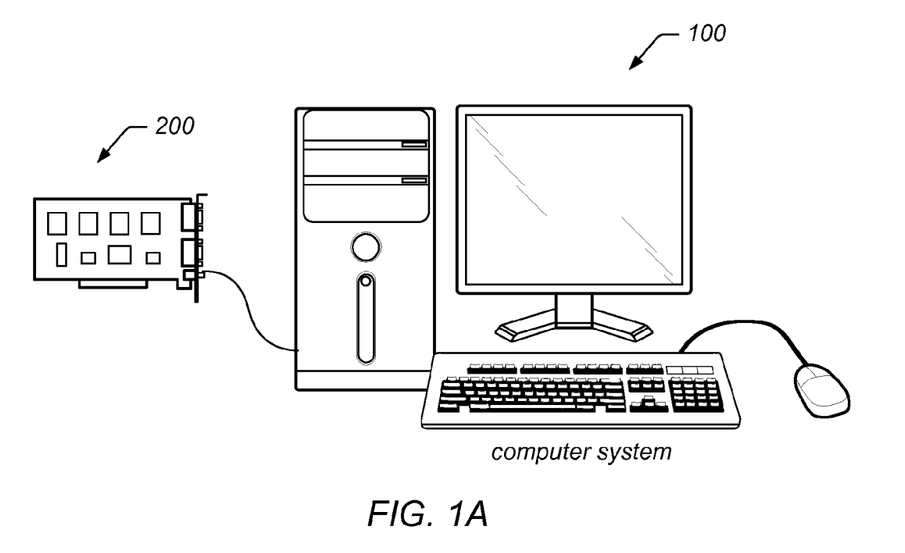
FIGS. 1A and 1B illustrates a computer system coupled to a real time target, according to an embodiment.
Figure 1B:
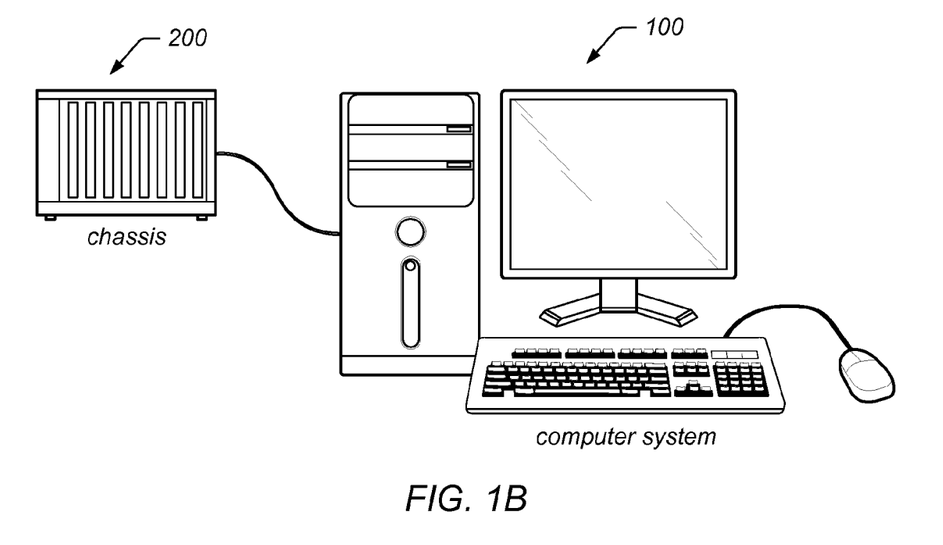

FIGS. 1A and 1B—Exemplary System Including a Real Time Device

FIGS. 1A and 1B illustrate embodiments of a system including a real time target for executing programs. As shown in FIG. 1A, the system may include a computer system 100 coupled, e.g., through a network, (or other transmission medium) to a real time device 200 (e.g., an embedded device), also referred to as a real time target 200. In other embodiments, the computer system 100 may be coupled to the target device 200 via an intermediate hub, which may communicate with the computer system 100 over a network, and which may communicate with the target device 200 via wired or wireless means.

The computer system 100 may be any of various types of computer systems. Computer system 100 may include a processor, a memory medium, as well as other components as may typically be found in a computer system. The memory medium of the computer system may store a program development environment for creating programs. As used herein, the term program is intended to include text-based or graphical instructions which are executable, compilable, and/or interpretable by a processor or programmable hardware element (such as a Field Programmable Gate Array (FPGA)) to perform a specified function or functions.

In one embodiment, the program development environment is a graphical program development environment for creating graphical programs. An exemplary graphical program development environment is the LabVIEW™ development environment offered by National Instruments Corporation. Another exemplary graphical program development environment is the SIMULINK™ development environment offered by The MATHWORKS™. A user may create a program on a computer system, and computer system 100 may provide the program to target device 200, optionally via a hub device.

Target device 200 may include a processor and memory medium for executing programs, such as graphical programs. In one embodiment, the target device 200 executes programs, e.g., graphical programs, received from the computer system over a network. In another embodiment, the computer system 100 sends the program to a hub device over a network, and the hub device operates to deploy the programs to the target device 200, e.g., in a wireless fashion, and the program executes on target device 200 in real time. It should be noted that in various embodiments, the target device 200 may be implemented as a card in a computer system (e.g., as shown in FIG. 1A) or in different devices, such as, for example, a device with an ARM processor, as described below, a PXI chassis which includes an embedded device card (as shown in FIG. 1B), or any other processor based device suitable for embedded systems. One exemplary target device 200 is a smart sensor (e.g., a smart camera).

In one embodiment, the target device 200 may include a programmable hardware element, such as an FPGA. The target device 200 may be operable to receive a hardware configuration file, e.g., a netlist, which encodes a desired functionality, and to deploy the hardware configuration file to the FPGA, thereby configuring the FPGA to perform the desired functionality.

Target device 200 may be connected to computer system 100 by a network. The network may be comprised of any of the various types of networks including local area networks (LAN), wide area networks (WAN), etc. One example of a wide area network is the Internet. Target device 200 may also connect to computer system 100 through other communication mediums, such as a serial bus, e.g., USB or IEEE 1394, a parallel bus, PCI, PCI Express, or through wireless means. The wireless communication mechanism may comprise any of various types of wireless transmission, including Blue Tooth, IEEE 802.11 (wireless Ethernet), RF communication, and other types of wireless communications, such as, for example, communication via satellite, and cell towers, such as used for cellular telephone communication, among others. In various embodiments, the target device 200 may include or may be coupled to one or more sensors or actuators. For example, the target device 200 may include a radio and may be coupled to a sensor via wireless means. In one embodiment, one or more of the sensors coupled to the target device 200 may be smart sensors, i.e., may include a processor and memory (and/or a programmable hardware element, such as an FPGA), and therefore may be operable to execute program code and/or receive commands from the target device 200 as a result of execution of the program code.

Embedded Devices

As mentioned above, in various embodiments of the present invention, the real time device 200 may be coupled to the host computer 200. As used herein, the term "real time device" has its ordinary accepted meaning, and refers to a (typically small) platform which includes dedicated hardware and/or software (such as a real time operating system) that is designed to provide real time or deterministic performance. A "real time device" generally includes a processor and memory (and/or programmable hardware element) on which may be installed dedicated programs or software. The real time device includes a real time operating system or other software designed to ensure deterministic behavior, and is configured to execute such programs or software in real time. A real time device is typically designed to perform a defined task very well, and generally does not include display capabilities or user interface software. In particular, a real time device is typically not a device with general purpose capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. An example of a real time device is an Internet remote camera, with dedicated hardware and software that implements the following tasks:

it acquires images from the optical device,
  it compresses these images as GIF or JPEG files, or perhaps as MPEG streams, and
  it sends the images to a host computer upon request, using TCP/IP, HTTP, or multimedia streams.

Other examples of real time devices include a measurement device with a specific type of measurement hardware and/or software for taking certain measurements, a control measurement device with a specific type of hardware and/or software for performing certain control operations, etc.

The end user does not care about how these tasks are implemented, but only wants a device that operates in real time, and normally, in a deterministic manner. Real time systems are often used as building blocks for more complicated applications. Thus, a real time device generally includes both hardware and software. Additionally, real time devices are generally built around a specialized hardware component, which is the "reason to exist" for these devices (like the camera in the above example). Other typical components include: a processor, such as an ARM processor, RAM and ROM memory, a storage medium, a display, one or more communication devices, and power and over-voltage protection components. Generally, flash memory is used for data storage in addition to RAM.

Figure 2:
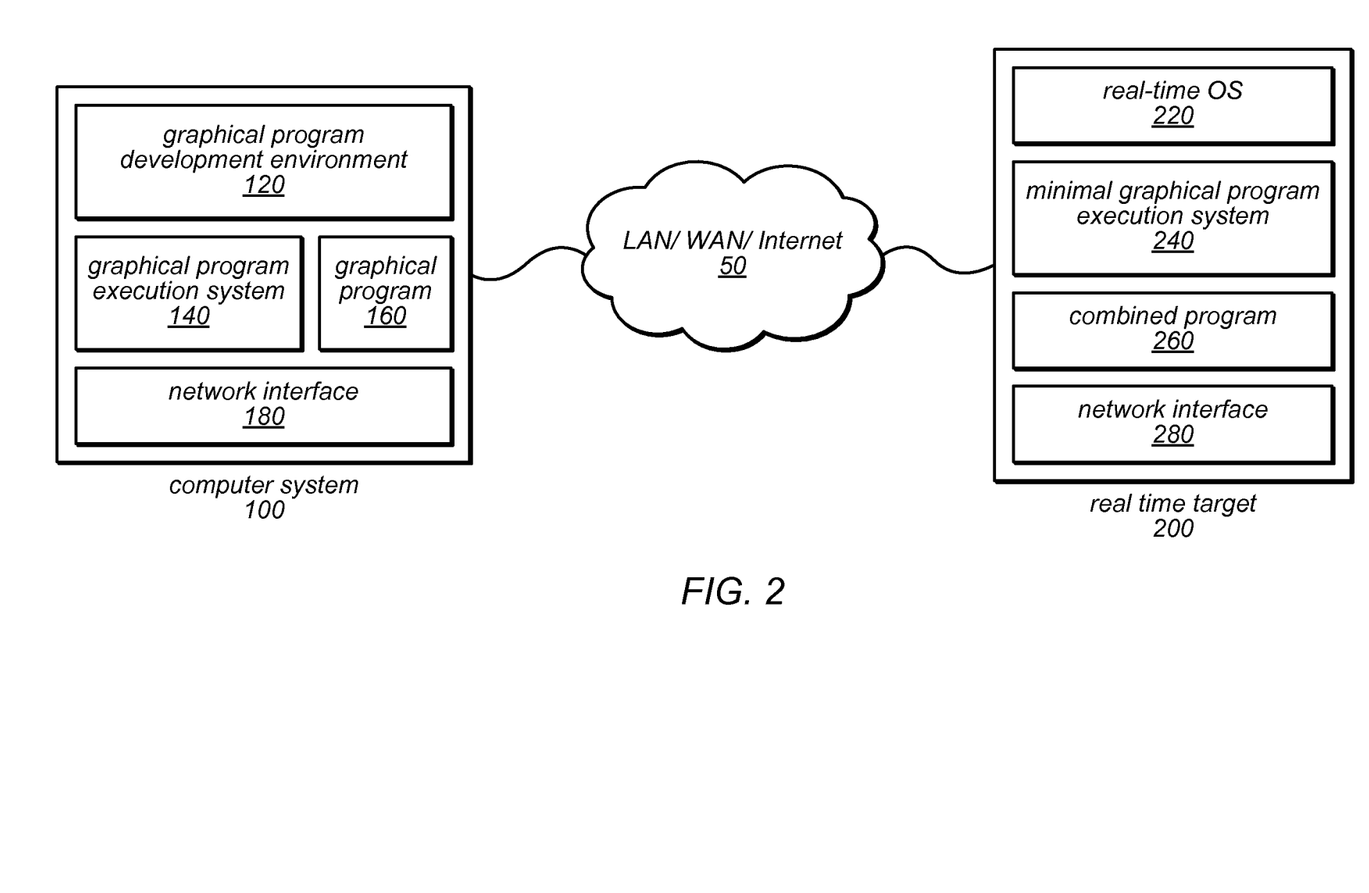
FIG. 2 is an exemplary block diagram of the system of FIGS. 1A and 1B, according to an embodiment.

FIG. 2—Block Diagram of the Exemplary System

FIG. 2 is a block diagram of the exemplary system of FIGS. 1A and 1B, according to one embodiment. In the embodiment shown in FIG. 2, the computer system 100 includes a program development environment 120, e.g., a graphical program development environment, which facilitates development of programs, e.g., graphical programs, for implementing desired functions or operations, as well as a program execution system 140, also referred to as the execution system 140. The execution system 140 may be operable to execute programs developed with the program development environment 120 (or other program development environments).

As used herein, the term "execution system" may include at least one software program that is designed to execute a certain class of programs. For example, LabVIEW programs utilize an execution system (a LabVIEW graphical program execution engine) that executes in a system in order to execute LabVIEW graphical programs.

The execution system 140 may include a componentized or modular architecture, e.g., a componentized callback system, stored on the computer system for partial transfer to an external device, e.g., the target device 200. In other words, the functions of the execution system 140 may be organized into modular components which may be operable to be transferred entirely or in part to the target device 200 to facilitate execution of programs on the target device 200. In many of the embodiments described herein, the systems and methods are described in terms of graphical programs, although it should be noted that the invention is broadly applicable to other types of programs as well, e.g., text-based programs, etc., and is not intended to be limited to graphical programs.

As FIG. 2 also shows, the computer system 100 may also store one or more programs 160 (e.g., graphical programs) which are executable via the execution system 140 (or portions thereof) to perform specified functions or operations, as desired. In the embodiment shown, the graphical program 160 may be stored for transferal to the target device 200 for execution. As will also be described in more detail below, various components of the execution system 140 may be combined with respective portions of the graphical program 160 for transferal to the target device 200 for execution. The computer system 100 may also include a network interface 180 for communicating over a network with devices on the network 50. For example, the network interface 180 may be an Ethernet interface for communicating over the Internet.

In an alternate embodiment, the graphical program 160 may be provided from a first computer, and components of the execution system 140 necessary for execution of this graphical program may be provided from a second different computer system.

In the embodiment of FIG. 2, the target device 200 includes an operating system 220, e.g., a real-time operating system (OS), for managing program execution, managing device resources, and communications in real time devices, as is well known in the art. Examples of real-time operating systems 220 include, but are not limited to, Linux, NetBSD, vxWorks, eCos, and Windows CE. Due to size and performance issues, the eCos real-time operating system may be particularly suitable for use in the target device 200, although other real-time operating systems are also contemplated. The target device 200 may also include a target execution system (or "minimal execution system") 240, which preferably is a minimal embedded graphical program execution system, and which may include a subset of the execution system 140 stored on the computer system 100, mentioned above. The minimal execution system 240 may be optimized to minimize the memory footprint on the target device 200. In one embodiment, the minimal execution system 240 may comprise an execution system virtual machine.

The minimal execution system 240 may facilitate execution of graphical program(s) 160 by the target device 200. More specifically, the graphical program 160 stored on the computer system 100 may be combined with one or more components of the componentized callback system of execution system 140 to generate a flatfile which may be transferred to the target device 200, e.g., over the network 50 via the network interface 280 of real time target 200. The flatfile may be directly executable by the target device 200. Alternatively, the flatfile may be used in constructing a combined program 260 on the target device 200, wherein the combined program 260 may be executed on the target device 200. The target embedded device 200 may also include software for performing various functions, such as a program linker/loader, which in various embodiments may be comprised in the real time OS, the minimal execution system 240, or may be stored and executed as a separate program.

Figure 3A:
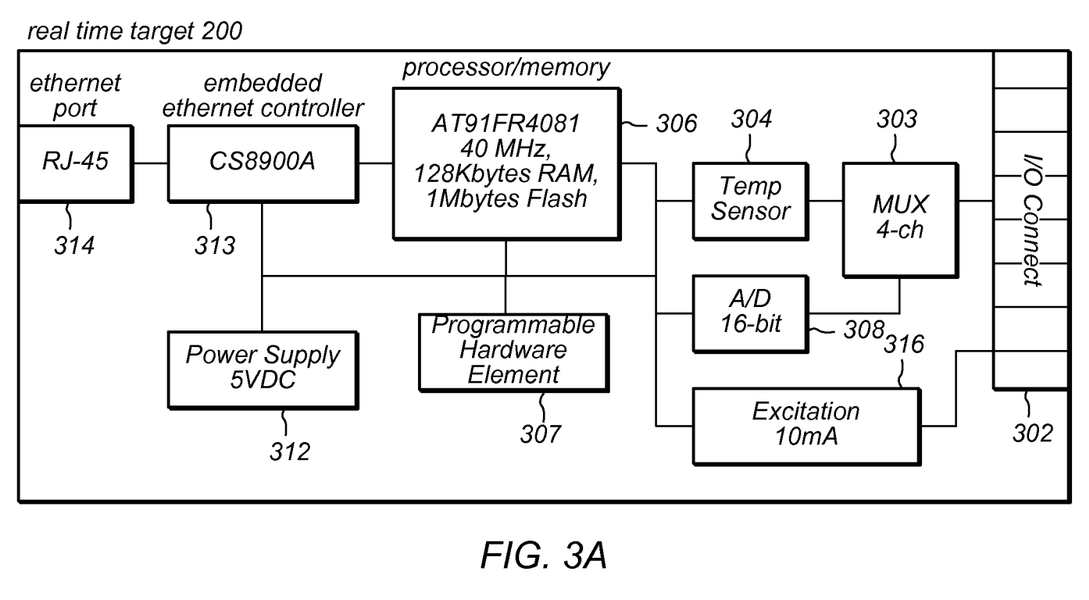
FIGS. 3A-3C are exemplary block diagrams of the real time target, according to an embodiment.
Figure 3B:
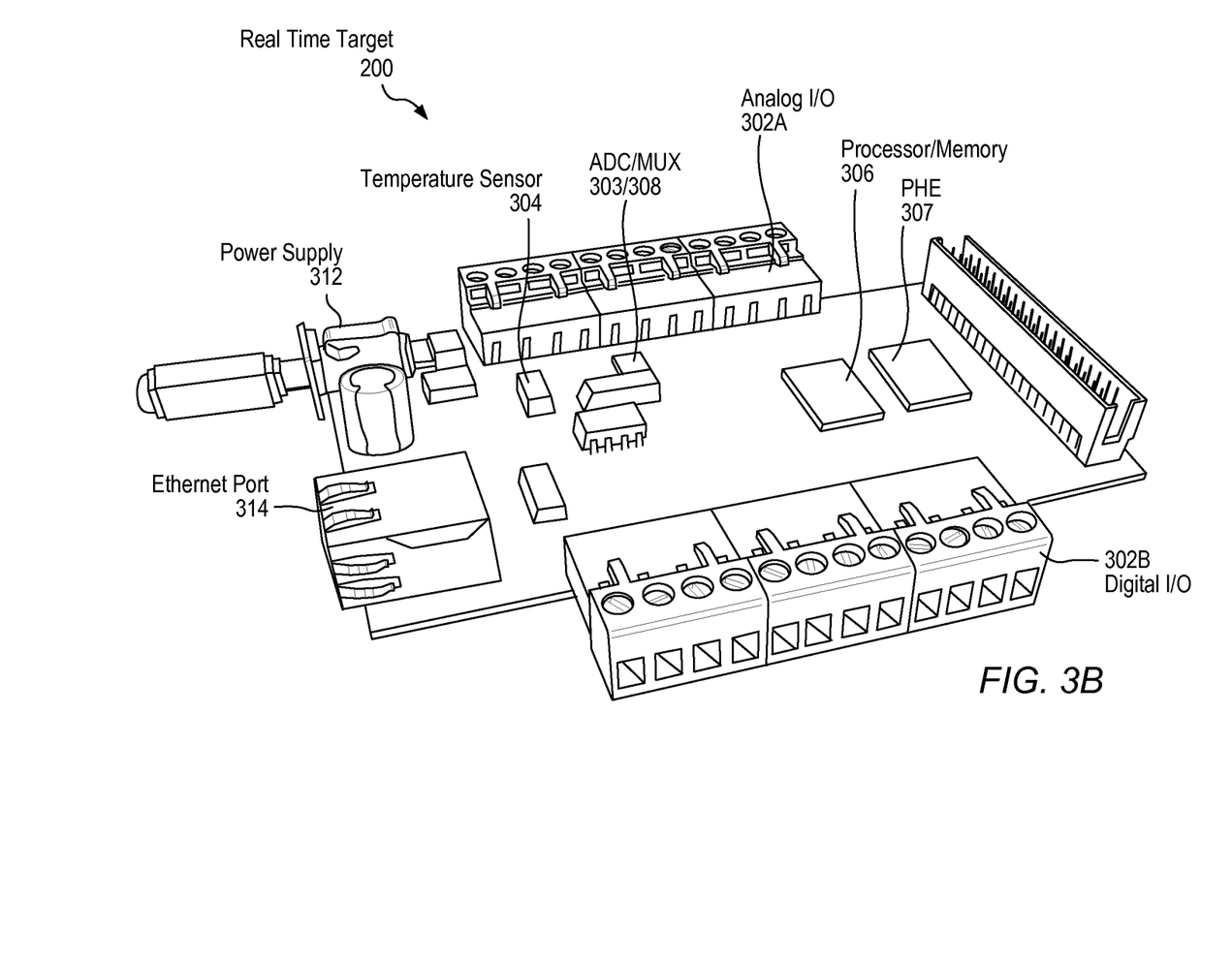
Figure 3C:
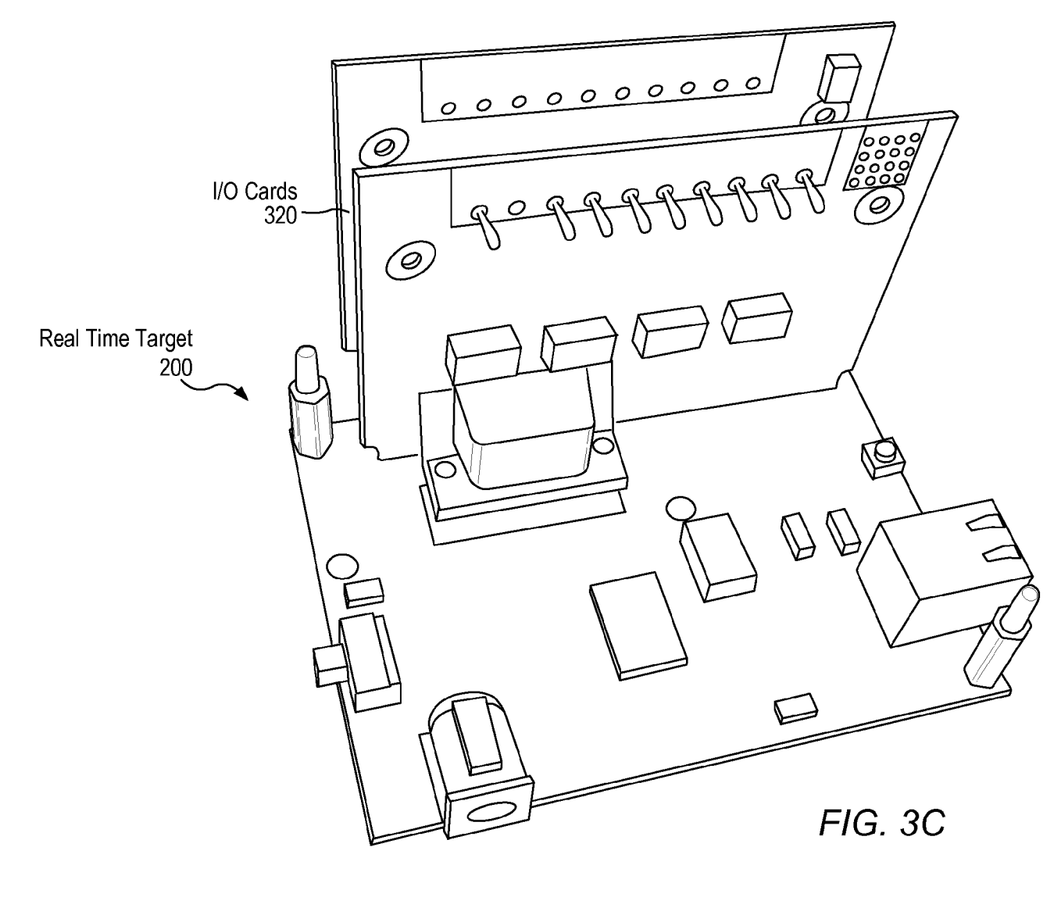

FIGS. 3A-3C—Embedded Device Hardware Configuration

FIG. 3A illustrates a hardware configuration of one embodiment of the target device 200, as shown in FIGS. 1A, 1B, and 2. It should be noted that the embodiment shown is intended to be exemplary only, and is not meant to limit the target device 200 to any particular architecture, components, size, or form.

In the embodiment shown in FIG. 3A, the target device 200 may include an I/O connector 302 coupled to a 4-channel multiplexer (MUX) 303, connected to a 4-channel 16-bit ADC 308, a temperature sensor 304, a micro-controller with internal flash program memory and data SRAM 306, a programmable hardware element 307, and Ethernet port 314 (e.g., controlled by embedded Ethernet controller 313). In this embodiment, power is provided by a 5 volt DC power supply 312. The processor 306, an ATMEL ARM Thumb AT91FR4081, may have a high-performance 32-bit RISC architecture with high-density 16-bit instruction set and very low power consumption. By combining the micro-controller, featuring 136 Kbytes on on-chip SRAM and a wide range of peripheral functions, with 8 Mbits of Flash memory in a single compact 120-ball BGA package, the Atmel AT91FR4081 306 provides a powerful, flexible, and cost-effective solution to the minimal embedded control application. Significant board size reduction is also noted as a benefit.

As noted above, the real time target 200 may include the programmable hardware element 307. In various embodiments, the programmable hardware element 307 and the processor 306 (such as the specific Atmel processor described above) may execute in conjunction to perform functionality (e.g., where the processor provides a human interface and the programmable hardware element is configured to perform the main body of the execution). However, in alternate embodiments, they may perform separate functions or the real time target 200 may only include one of the programmable hardware element 307 and the processor and memory 306, as desired.

FIG. 3B illustrates the embedded hardware of FIG. 3A, according to one embodiment. As FIG. 3B shows, the hardware components included in the target embedded device 200 facilitate an extremely compact form factor. Additionally, the I/O 302 may be separated as Analog I/O 302A and Digital I/O 302B, according to some embodiments.

FIG. 3C illustrates another embodiment of the embedded target device 200, according to one embodiment. As FIG. 3C shows, in this embodiment, substantially all of the functionality included on the board may be modular. For example, different I/O boards 320 may be selected and plugged-in depending on the type of sensors required by the application. In this embodiment, components which may be provided by additional modules (e.g., cards) have been remove, such as the temperature sensor 304 and the ADC 308. In this embodiment, a micro-controller with internal 1 MB of flash program memory and 128 kb of data SRAM is connected via SPI (serial peripheral interface) to an analog small form-factor DAQ slot, and is further connected via a digital bus to a digital small form-factor DAQ slot. This embodiment may be particularly suited for smart sensing, computing, and control, due to the design emphasis on modularity.

In all of the embodiments shown above, it is noted that only necessary acquisition and processing code may be packaged and downloaded onto the embedded device (using the combined program or flatfile).

Figure 4:
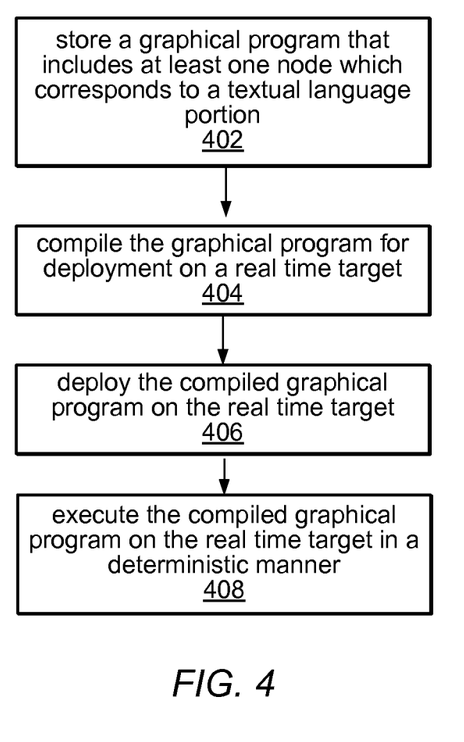
FIG. 4 is a flowchart diagram illustrating one embodiment of a method for compiling a graphical program having a textual language program portion for a real time target.

FIG. 4—Compiling a Graphical Program for a Real Time Target

FIG. 4 illustrates a method for compiling a graphical program having a textual language program portion for a real time target. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a graphical program may be created or otherwise stored on the computer system 100 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 402 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

Figure 5A:
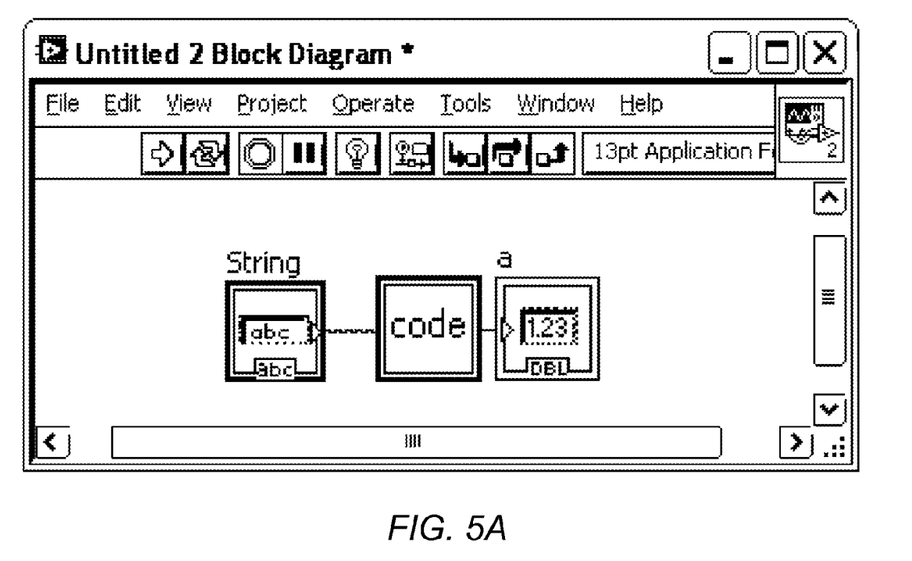
FIGS. 5A and 5B are exemplary graphical programs including textual program portions, according to an embodiment.
Figure 5B:
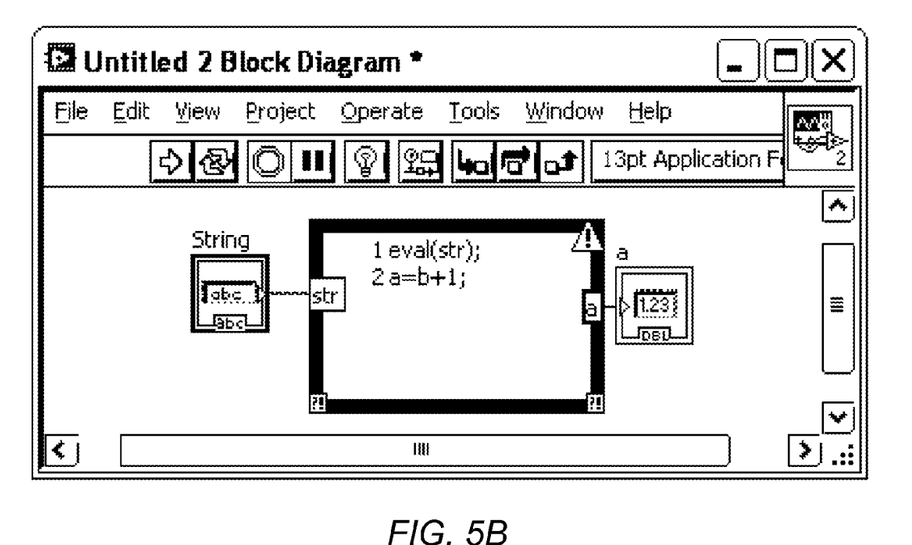

The graphical program may include at least one node (or portion) which corresponds to a textual language program portion. The textual language program portion may be written in a loosely or dynamically typed programming language. Thus, the textual language program may not explicitly define data types of variables in the code of the textual language program portion. In various embodiments, the user may specify the textual language program portion by manually entering the code, automatically generating the code from user specification, and/or importing existing code from other sources (e.g., already existing m-files). FIGS. 5A and 5B illustrate simple graphical programs which include textual program portions.

In 404, the graphical program may be compiled for deployment on a real time target. Compiling the graphical program may include compiling the textual language program portion for real time execution. In various embodiments, the textual language program portion may need to be modified (or optimized) in the compiling process such that the graphical program can execute in real time on the real time target, e.g., in a deterministic manner.

For example, in one embodiment, as indicated above, the textual program portion may be written in a loosely typed or dynamically typed textual language. Thus, the types of variables in the textual program portion may not be known based on the code of the textual program portion. In such embodiments, compiling the graphical program may include inferring strict types for the textual language program portion. Inferring strict types for the textual language program portion may include using generic data types for variables in the textual language program portion and then inferring the data types of each variable, e.g., using type propagation of the textual program portion.

In one embodiment, the textual program portion may be converted into a graphical data flow program portion. In other words, the textual code of the textual program portion may be converted to graphical code (e.g., a plurality of nodes connected by lines which visually indicate the functionality of the textual program portion). The graphical code may be data flow code, as desired. Following the embodiments above, the graphical program portion may initially utilize generic or variant data types, and then the actual data types of the graphical program portion (and therefore, the textual program portion) may be inferred, e.g., using type propagation throughout the graphical program portion and/or graphical program.

By inferring strict types, the compiling may provide code which will deterministically execute on the real time target. However, it should be noted that various other optimizations and conversions of data types may be performed, e.g., to ensure deterministic execution on the real time target and/or to ensure that the graphical program (and in particular the textual program portion) is able to execute on the real time target. For example, various functions or procedures, e.g., which are not compatible with a selected real time target, may be modified or converted to ensure that the graphical program can be executed on the real time target, e.g., in a deterministic manner.

Compiling the graphical program may include generating a hardware description file for a programmable hardware element (e.g., a field programmable gate array (FPGA)) comprised in the real time target or for a programmable hardware element in general. The hardware description may at least include functionality described or specified by the textual program portion. For example, compiling the graphical program may include generating a netlist for configuring the programmable hardware element.

In 406, at least a portion of the graphical program may be deployed to the real time target. According to various embodiments, deploying the graphical program to the real time target may include configuring a programmable hardware element included in the real time target, deploying a real time execution engine on the real time target, and/or any of the actions or methods described above, e.g., regarding FIGS. 3A-3C.

In 408, the graphical program may be executed at least in part by the real time target. In various embodiments, the real time target (e.g., as specified in the graphical program) may communicate with various devices (e.g., computer systems, sensors, devices, etc.) to perform functionality specified by the graphical program (e.g., the textual program portion of the graphical program).

The real time target may execute in real time in a deterministic manner. In various embodiments, the real time target may execute with one or more other devices to provide execution of the graphical program in a distributed manner. For example, the textual program portion may execute on the real time target while other portions may execute on a desktop computer.

In further embodiments, the graphical program may be debugged, e.g., according to any of the debugging methods described in the patent applications incorporated by reference above. For example, various probes, breakpoints, watches, etc. may be used to debug a graphical program (e.g., including the textual program code) executing on the real time target. Additionally, where the real time target includes a programmable hardware element, the code implemented on the programmable hardware element may also be debugged.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium comprising program instructions executable by one or more processors to:
- display a graphical program on a display, wherein the graphical program comprises a plurality of connected nodes which visually indicate functionality of the graphical program, wherein the graphical program comprises at least one node which corresponds to a textual language program portion, wherein the textual language program portion is written in a dynamically typed programming language, wherein the textual language program portion exists prior to compilation of the graphical program;
- compile the graphical program for deployment on a real time target, wherein said compiling the graphical program comprises compiling the plurality of connected nodes and the textual language program portion into executable code configured for deterministic real time execution on the real time target,
- wherein said compiling the textual language program portion comprises automatically converting the textual language program portion into a graphical program portion and compiling the graphical program portion; and
- store the executable code on a storage device.

2. The memory medium of claim 1, wherein said compiling the graphical program comprises inferring strict types for the textual language program portion.

3. The memory medium of claim 2, wherein said inferring strict types for the textual language program portion comprises using generic data types for variables in the textual language program portion.

4. The memory medium of claim 1, wherein the graphical program is a data flow graphical program.

5. The memory medium of claim 1, wherein the real time target comprises a programmable hardware element, wherein said compiling the graphical program comprises generating a hardware description file for the programmable hardware element based on at least a portion of the textual language program portion, and wherein the program instructions are further executable to:
- configure the programmable hardware element according to the hardware description file.

6. The memory medium of claim 1, wherein the program instructions are further executable to:
- deploy the executable code on the real time target; and
- execute the executable code on the real time target in a deterministic manner.

7. A method, comprising:
- a computer system receiving a graphical program stored on a memory medium, wherein the graphical program comprises a plurality of connected nodes which visually indicate functionality of the graphical program, wherein the graphical program comprises at least one node which corresponds to a textual language program portion, wherein the textual language program portion is written in a dynamically typed programming language, wherein the textual language program portion exists prior to compilation of the graphical program;
- the computer system displaying the graphical program on a display device;
- the computer system compiling the graphical program for deployment on a real time target, wherein said compiling the graphical program comprises compiling the plurality of connected nodes and the textual language program portion into executable code configured for deterministic real time execution on the real time target,
- wherein said compiling the textual language program portion comprises automatically converting the textual language program portion into a graphical program portion and compiling the graphical program portion; and
- the computer system storing the executable code on a storage device.

8. The method of claim 7, wherein said compiling the graphical program comprises inferring strict types for the textual language program portion.

9. The method of claim 8, wherein said inferring strict types for the textual language program portion comprises using generic data types for variables in the textual language program portion.

10. The method of claim 7, wherein the graphical program is a data flow graphical program.

11. The method of claim 7, wherein the real time target comprises a programmable hardware element, wherein said compiling the graphical program comprises generating a hardware description file for the programmable hardware element based on at least a portion of the textual language program portion, and wherein the method further comprises:
- configuring the programmable hardware element according to the hardware description file.

12. The method of claim 7, further comprising:
- deploying the executable code on the real time target; and
- executing the executable code on the real time target in a deterministic manner.

13. A system, comprising:
- a processor;
- a display device coupled to the processor; and
- a memory medium coupled to the processor, wherein the memory medium stores program instructions executable by the processor to:
  - display a graphical program on the display device, wherein the graphical program comprises a plurality of connected nodes which visually indicate functionality of the graphical program, wherein the graphical program comprises at least one node which corresponds to a textual language program portion, wherein the textual language program portion is written in a dynamically typed programming language, wherein the textual language program portion exists prior to compilation of the graphical program;
  - compile the graphical program for deployment on a real time target, wherein said compiling the graphical program comprises compiling the plurality of connected nodes and the textual language program portion into executable code configured for deterministic real time execution on the real time target, wherein said compiling the graphical program further comprises inferring strict types for the textual language program portion; and
  - store the executable code on a storage device.

14. The system of claim 13, wherein said compiling the graphical program comprises automatically converting the textual language program portion into a graphical program portion and compiling the graphical program portion.

15. The system of claim 13, wherein said inferring strict types for the textual language program portion comprises using generic data types for variables in the textual language program portion.

16. The system of claim 13, wherein the graphical program is a data flow graphical program.

17. The system of claim 13, wherein the real time target comprises a programmable hardware element, wherein said compiling the graphical program comprises generating a hardware description file for the programmable hardware element based on at least a portion of the textual language program portion, and wherein the program instructions are further executable to:
   configure the programmable hardware element according to the hardware description file.

* * * * *